UNITED STATES PATENT OFFICE.

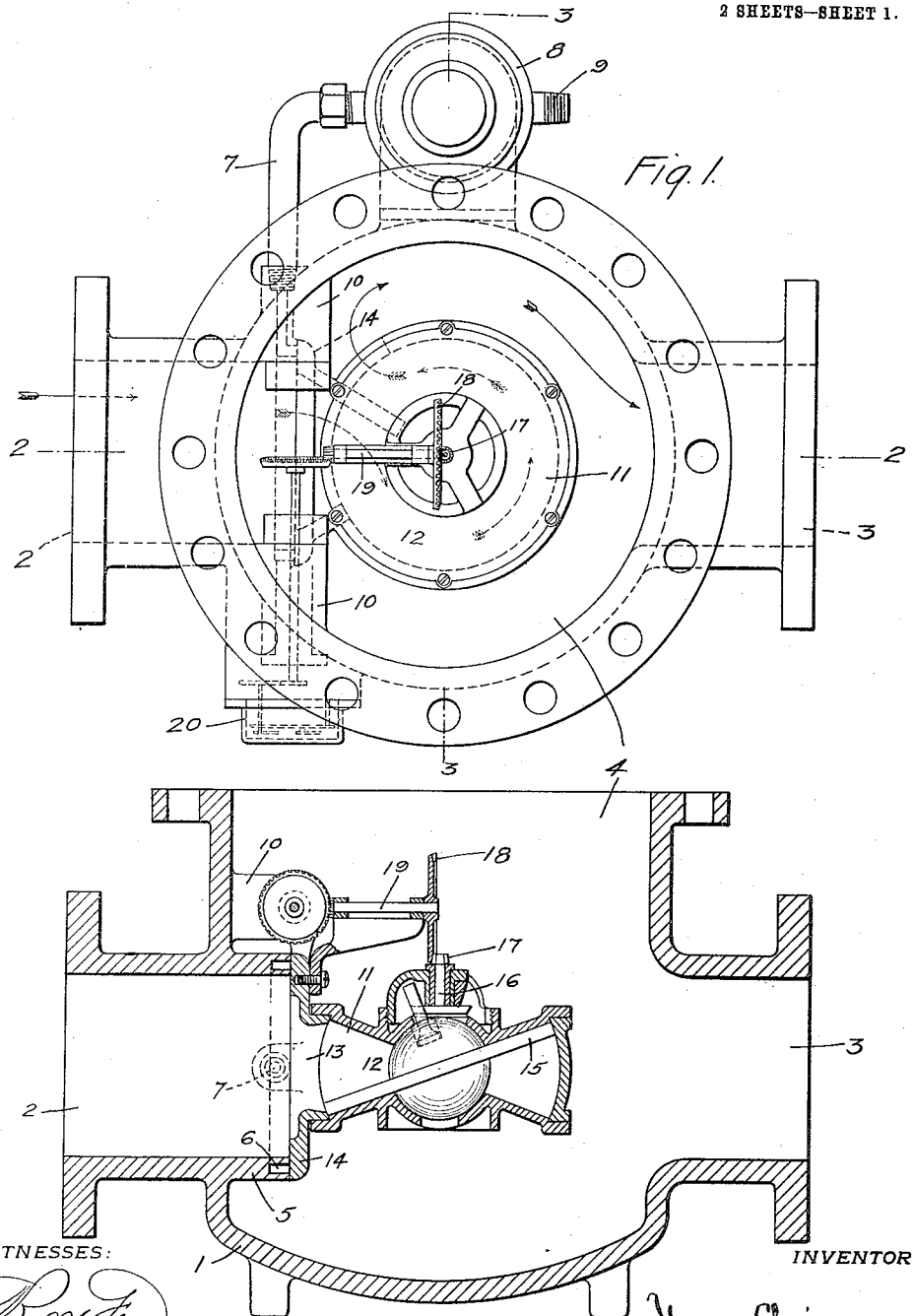

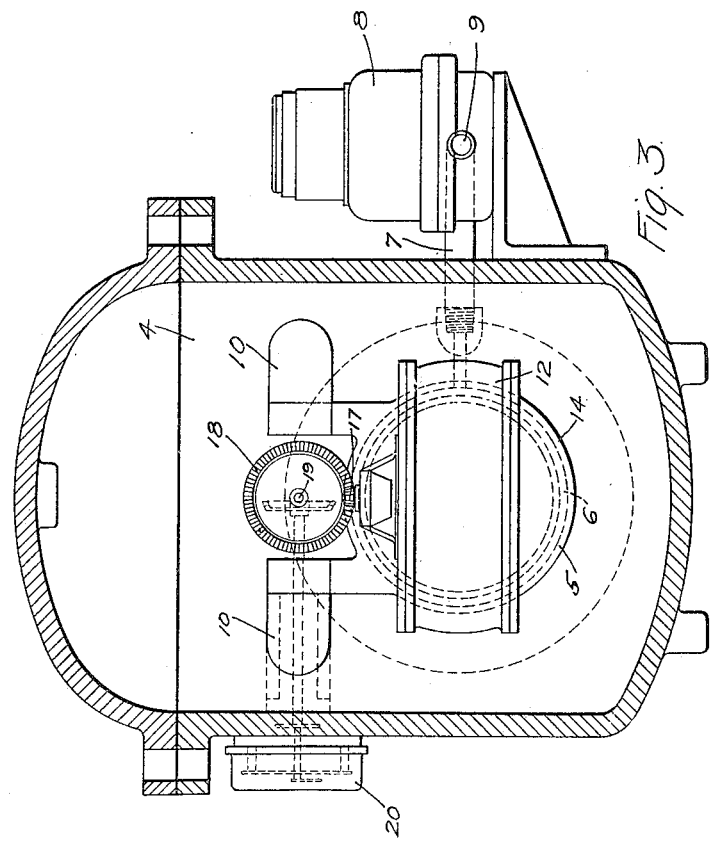

HORACE CHRISMAN, OF EDGEWOOD PARK, PENNSYLVANIA, ASSIGNOR TO PITTSBURG METER COMPANY, A CORPORATION OF PENNSYLVANIA.

MEANS FOR MEASURING AND INDICATING FLOWS.

1,134,373.

Specification of Letters Patent. Patented Apr. 6, 1915.

Application filed January 14, 1910. Serial No. 538,150.

*To all whom it may concern:*

Be it known that I, HORACE CHRISMAN, a citizen of the United States, and a resident of Edgewood Park, in the county of Allegheny and State of Pennsylvania, have made a new and useful Invention in Means for Measuring and Indicating Flows, of which the following is a specification.

This invention relates to means for measuring fluid passing through a suitable conduit and particularly to means employed in connection with water mains whereby the normal consumption of water will be measured in gallons, or any other suitable unit, while any abnormal demands made upon the main will be indicated, for example, measured during the time of the abnormal flow. It has become a general practice to employ private fire service in connection with large buildings and to be used in case of emergency between the time that the fire is discovered and the regular fire department may appear. It is understood that the water used in the fire service is gratis or is not charged for at the rate at which ordinary service water is charged. It has been found that unscrupulous persons are apt to take advantage of this provision and use water through the fire service instead of through the ordinary service pipes equipped with proper meters for measuring the flow. It is the purpose of my invention to provide a main or service pipe with a registering meter which will measure the flow in gallons or any suitable unit, if the water is being used under normal conditions (that is for ordinary service use) but open communication to an auxiliary meter or indicator in the event that an abnormal flow of water is passing through the main (as in the case of fire service) and the auxiliary meter will indicate the time during which the abnormal flow has taken place. By such an arrangement it can be ascertained by inspection whether or not water has been drawn from the main other than in the ordinary manner and if an abnormal flow has taken place at any time the auxiliary indicator will indicate such abnormal condition.

In the drawings illustrating one embodiment of my invention, Figure 1 illustrates a plan view of a main union to which my invention is applied and having the cover removed so as to afford a view of the interior mechanism.

Figure 2 is a sectional view on the line 2—2 of Figure 1, and

Figure 3 is a sectional view on the line 3—3 of Figure 1 parts being shown in full.

Referring now to the drawings by numerals of reference, 1 designates a union having an inlet 2 and an outlet 3. The union 1 is provided with an opening 4 at its top which may be provided with a suitable cover properly secured so as to inclose the mechanism within the union. Concentric with the walls of the inlet port 2 is an inwardly disposed flange 5 having a circumferential groove 6 in its end which communicates with a pipe 7 leading to an indicator, as a time meter 8 of any approved construction and which exhausts through a pipe 9 to atmosphere. Above the flange 5 are brackets 10 on which is supported the measuring chamber 11 of a water meter 12. The inlet port 13 to the water meter is provided with a circumferential flange 14 which under normal conditions rests against the groove 6 so as to close it and prevent water from entering said groove when the flange 14 is seated against the end of the flange 5. The water meter 12 may be of any preferred form but is here shown as provided with a gyratory diaphragm 15 which communicates motion to a shaft 16 and through the gear 17 thereof communicates motion to the gear 18 and its shaft 19 and thence to a suitable register 20 through a train of gears in any well known manner. When the water flows into the inlet 2 of the union it may follow the path indicated by the arrows in Figure 1 and pass out through the outlet 3 and in this manner all of the water passing through the union will be measured according to some well known standard. It is to be understood that the measuring chamber or casing of the meter 12 will be of sufficient weight to seat itself against the flange 5. Due to the difference in pressure within the union and the atmospheric pressure in groove 6 the meter 12 will remain seated during the time that water is passing through the meter 12 up to its rated capacity. If from any cause the pressure on the outlet side of the union 1 drops sufficient, due to abnormal demand at the exhaust side or from other causes, the pressure on the inlet side of the meter 12 will be sufficient to unseat it so that the groove 6 will be uncovered and water will pass into the groove 6 out through the pipe 7 into the indicator 8 and exhaust through the pipe 9. When the meter 12 is swept off its seat by the aforesaid pressure drop the flow of the water will be unimpeded, as the weight of the meter itself will be insufficient to retard the flow to any appreciable extent. During the time that the groove 6 is uncovered the indicator 8, if a meter, will continue to register so this meter serves as a tell tale meter or detector meter to indicate by its mechanism (which may be of any approved form) the time during which the abnormal condition prevailed.

By reference to the description and accompanying drawings it will be observed that in the event that it becomes necessary to make unusual demands upon the mains, as for example in the cases of fire service, the meter 12 and its flange 14 will be swept out of the path of the flow of water through the inlet 2 and outlet 3 and the flow of the water will be thus unimpeded. During this time the meter 12 will not register but the detector meter 8 will. As soon, however, as the unusual demand ceases the meter 12 will gravitate back to its seat, that is the flange 14 will rest against the end of the flange 5 and the meter 12 will again resume registering for all normal flows and the detector meter will be cut out.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim is:

1. The combination of a main having inlet and outlet ports, of a meter in the main for measuring normal flows through said main, and an indicator having a port within the main normally covered by the meter and uncovered by the meter when abnormal flows take place through the main.

2. In combination with a water main, a meter normally lying in the path of the flow of the water through said main, but automatically moving out of the path of the flow when the pressure on the discharge side of the meter is reduced beyond a pre-determined amount, and a detector meter having a port normally covered by the first named meter but adapted to be uncovered by said first named meter when said first named meter moves out of the path of the flow of the water.

3. The combination with a water main having a port, an indicator for indicating abnormal flows and in communication with the port in said water main and a measuring device for measuring flows in said water main for normally closing said port.

4. The combination with a water main of an indicator for indicating abnormal flows and having a port in communication with said water main and a gravitating measuring device for normally closing said port.

5. The combination with a water main, of a grooved flange in said main, a detector meter in ported communication with said groove in the flange, a water meter mounted for swinging movement in the main, and means on the water meter for normally closing the groove in the flange.

6. The combination with a water main, of a meter normally obstructing the passage of fluid through said main, a detector meter having a port within said main normally closed by the first named meter, and means supporting said meter so that reduction of pressure on one side of the meter will cause the meter to move out of the path of the flow through the main and at the same time open communication with the detector meter.

7. The combination with a water main of a meter for measuring normal flows through said main movably mounted in said main and normally lying in the path of the flow therethrough and adapted to move out of the path of flow upon a predetermined reduction of pressure on the discharge side of said meter upon the occurrence of an abnormal flow, whereby an unobstructed passage is provided for the water to pass said meter when such abnormal flow takes place.

8. The combination of a water main, a water meter in the main normally in the path of the flow and means whereby the same is mounted for swinging movement, said meter being adapted to be temporarily moved out of the path of flow of the water by excessive pressure of such flow.

9. The combination with a main, a pivoted meter casing, in the main and adapted to move out of the path of flow and having a hollow trunnion, of a registering mechanism and an actuating shaft for the registering mechanism, and receiving its motion from the mechanism within the meter casing, said shaft extending through the hollow trunnion.

10. The combination with a main, a meter casing in the main, a bracket therefor, a pivotal connection between the bracket and the meter casing to allow the meter to swing out of the path of flow in the main, a hollow trunnion in the bracket, and a register actuating shaft in the hollow trunnion and mechanism in the meter casing for actuating said actuating shaft.

11. A conduit section having a seat therein, a meter normally held to the seat by the pressure of water, and arranged to receive the flow of water in the conduit, there being a passage for relieving the water pressure on the seat whereby a differential pressure area is created upon the meter.

12. In a water system, a conduit, a seat surrounding the fluid passage of the conduit, there being a passage leading from the face of the seat and open to a relatively low pressure space, and a meter seated upon the seat and arranged to receive the flow of water in the conduit, but adapted to be driven from the seat by excess differential pressure upon the inlet side, and means whereby the meter is movably mounted in the conduit.

13. In a water system, a main having a seat encircling the water passage, a meter seated thereon, hinged to the main, arranged to receive the flow of water in the conduit, and adapted to be forced from its seat by excess differential pressure upon the inlet side of the meter.

14. In a water system, a conduit section, a seat in the conduit section and surrounding the water passage thereof, a meter communicating with atmospheric pressure, there being a passage from the meter to the seat in the conduit, a main meter normally engaging the seat and arranged to receive the flow of water in the conduit but movable from the seat under excess differential pressure upon the inlet side and means whereby the meter is movably mounted in the conduit.

15. In a water system, a conduit section formed with a housing, a seat surrounding the water passage of said section, and means including a meter engaging the seat and arranged to receive the flow of water in the conduit, said means being hinged so that under excess pressure it retreats from the water passage of said section to a position within the housing.

16. A conduit section provided with a seat encircling the water passage thereof, a pivoted member adapted normally to engage said seat, and including a meter adapted to receive and measure the flow through the conduit section when the pivoted member engages its seat, said pivoted member being adapted to be forced from its seat by, and thus afford an opening for, abnormal flow.

17. In combination with a distributing main, a meter located out of the line of flow through the main and having a port adapted to communicate therewith, and a meter adapted to receive and measure the flow when in line with the flow but movable into and out of the line of flow through the main whereby when the meter is moved out of the line of flow the port communicates with the line of flow and when the second meter is moved into the line of flow the port for the first-named meter is closed.

18. In combination with a distributing main, a meter located out of the line of flow through said main, a swinging meter adapted when in one position to receive and measure flows in the main and movable in response to varying flows through said main and means affected by the second mentioned meter for controlling the flow through the first named meter.

19. The combination with a water main having a port, an indicator for indicating abnormal flows in communication with the port in said water main, and a measuring device for measuring normal flows in said water main for normally closing said port.

20. The combination with a water main, of an indicator for indicating abnormal flows and having a port in communication with said water main, and a swinging measuring device measuring normal flows normally gravity-held in a position closing said port.

21. The combination with a water main of an indicator meter having a port in communication with the main, and movable means in the main movable to one position to render the indicator meter inoperative and to another position to render said indicator meter operative, said means comprising in part a normal flow meter having a port in communication with the main.

22. In combination with a water main, a meter normally lying in the path of the flow of water through said main, but automatically moving out of the path of the flow upon a variation of pressure above a predetermined difference on the two sides of the meter, and a detector meter having a port normally covered by the first named meter but adapted to be uncovered by said first named meter when the latter moves out of the path of the flow of water.

In testimony whereof, I have hereunto subscribed my name this 6th day of January, 1910.

HORACE CHRISMAN.

Witnesses:
C. W. McGhee,
C. H. McConnell.

Copies of this patent may be obtained for five cents each, by addressing the "Commissioner of Patents, Washington, D. C."